July 30, 1968

M. PRESTON 3,394,619

MECHANICAL TORQUE CONVERTER

Filed May 19, 1967

July 30, 1968 M. PRESTON 3,394,619
MECHANICAL TORQUE CONVERTER
Filed May 19, 1967 7 Sheets-Sheet 3
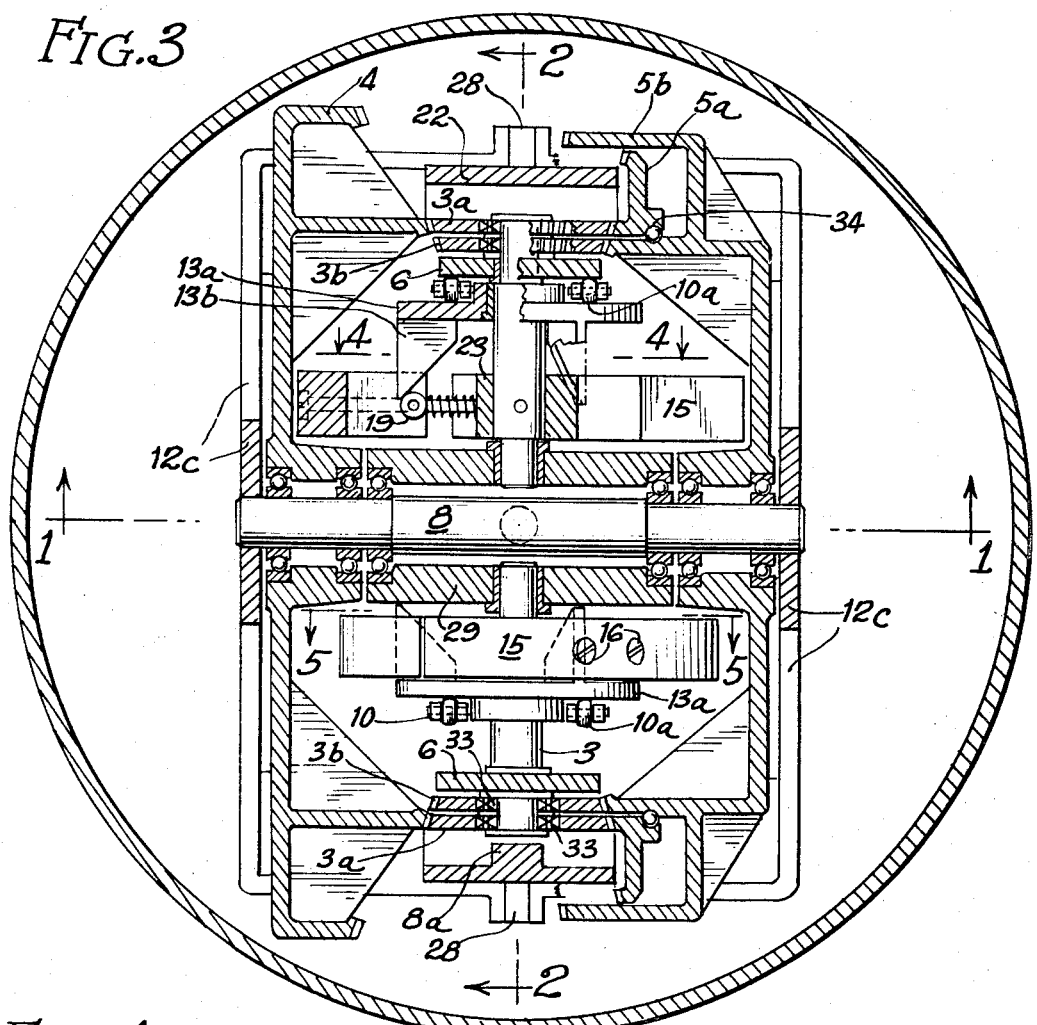
FIG.3
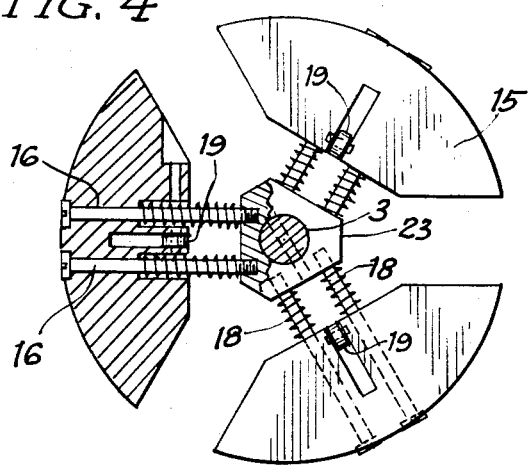
FIG. 4
FIG. 5

July 30, 1968  M. PRESTON  3,394,619
MECHANICAL TORQUE CONVERTER
Filed May 19, 1967

United States Patent Office 3,394,619
Patented July 30, 1968

3,394,619
MECHANICAL TORQUE CONVERTER
Martin Preston, 300 N. State St., Apt. 5701,
Chicago, Ill. 60616
Continuation-in-part of application Ser. No. 594,061,
Nov. 14, 1966. This application May 19, 1967, Ser.
No. 639,804
6 Claims. (Cl. 74—751)

ABSTRACT OF THE DISCLOSURE

A stepless, variable-speed power transmitting device in which the ratio of the input and output shaft speeds depends (a) on the external torque load applied to the output shaft and (b) on the speed of the power driven input shaft. The transmission of power from the input to the output shaft is by means of a spinning rotor the kinetic energy of which undergoes cyclical changes involving both the rotational speed and the mass inertia of the rotor. During one phase of the working cycle energy is transmitted by a gear train from the input shaft to the rotor axle and during another phase energy is transmitted from the rotor by gyroscopic forces to the output shaft.

This application is a continuation-in-part of my co-pending application Ser. No. 594,061, filed Nov. 14, 1966, now abandoned, which in turn is a continuation-in-part of my application, Ser. No. 501,637, filed Oct. 22, 1965, now abandoned.

This invention relates to a variable speed, stepless, mechanical power transmitting device which automatically adjusts the speed ratio between the input and output shafts of the device both as a function of the speed of the power source that drives the input shaft of the device and also as a function of the external torque load that is imposed on the output shaft of the device.

In contrast to conventional hydrodynamic torque converters, the device operates through the transfer of the momentum of rotating solid bodies and its mechanical efficiency depends solely on frictional losses in gears and bearings which can be minimized by the use of high quality, well lubricated, gears and antifriction bearings, while the efficiency of the hydrodynamic torque converter is strongly affected by sizeable energy losses due to turbulence and friction of the fluid used therein for the transfer of energy.

Another feature that contrasts this invention with the hydrodynamic type are the performance characteristics which for the present device can be summarized as follows:

(a) If the output shaft is held fast, the torque acting thereon will be proportional to the square of the speed of the input shaft. Under these conditions the power input would be zero were it not for the frictional losses in the bearings and in the gearing.

(b) If the speed of the input shaft is held constant while the output shaft performs work, the output torque either will vary linearly with the change in the speed of the output shaft, or will remain constant.

Disregarding the effect of friction, these performance characteristics can be defined concisely by the following mathematical relationships:

(1) $\quad M_1 = c_1(\omega_1\omega_2 - c_2\omega_2^2)$ (2) $\quad M_2 = c_1(\omega_1^2 - c_2\omega_1\omega_2)$ in which $M_1$ is the input torque, $M_2$ is the output torque, $\omega_1$ is the speed of the input shaft and $\omega_2$ is the speed of the output shaft. The constants $c_1$ and $c_2$ depend on several built-in parameters. By the judicious choice of these parameters the constant $c_2$ can take on positive or negative values, or can be made zero. In the latter case the output torque will cease to be dependent on the output speed and thus the mechanism becomes a constant torque device suitable, e.g., for driving with minimal loss of power a constant-tension winding machine. The operating principle of the device is the utilization of the enforced precession of a spinning body whose axial moment of inertia changes periodically in phase with the angle of precession and thereby produces a unidirectional gyroscopic moment which serves as the output torque.

In the drawings:

FIGURES 1a and 1b are fragmentary sectional views of a modification of the embodiment shown in FIGURE 1.

Figure 2:
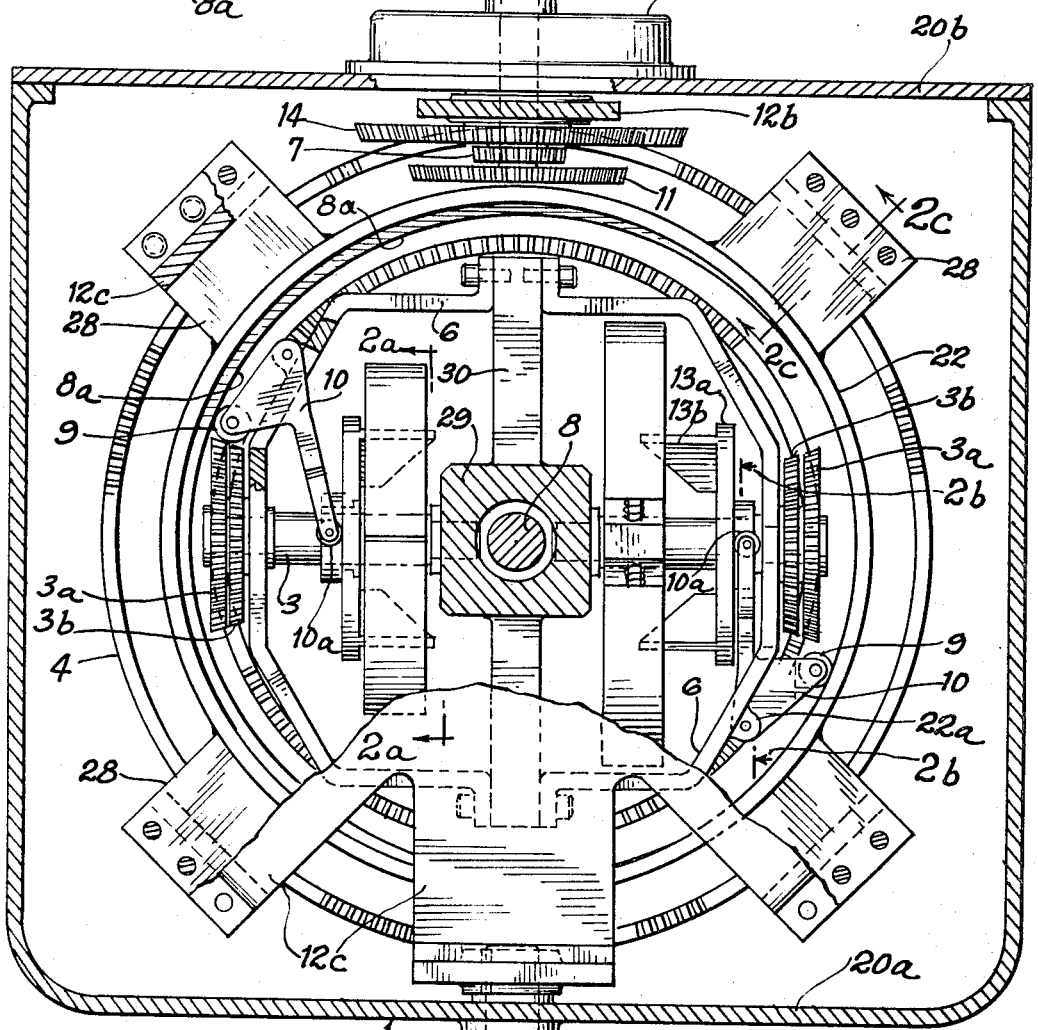
FIGURE 2 is an elevational sectional view taken on line 2—2 on FIGURE 1.

FIGURES 2a, 2b and 2c show details of portions of FIGURE 2 taken on lines 2a—2a, 2b—2b and 2c—2c, respectively.

Figure 1:
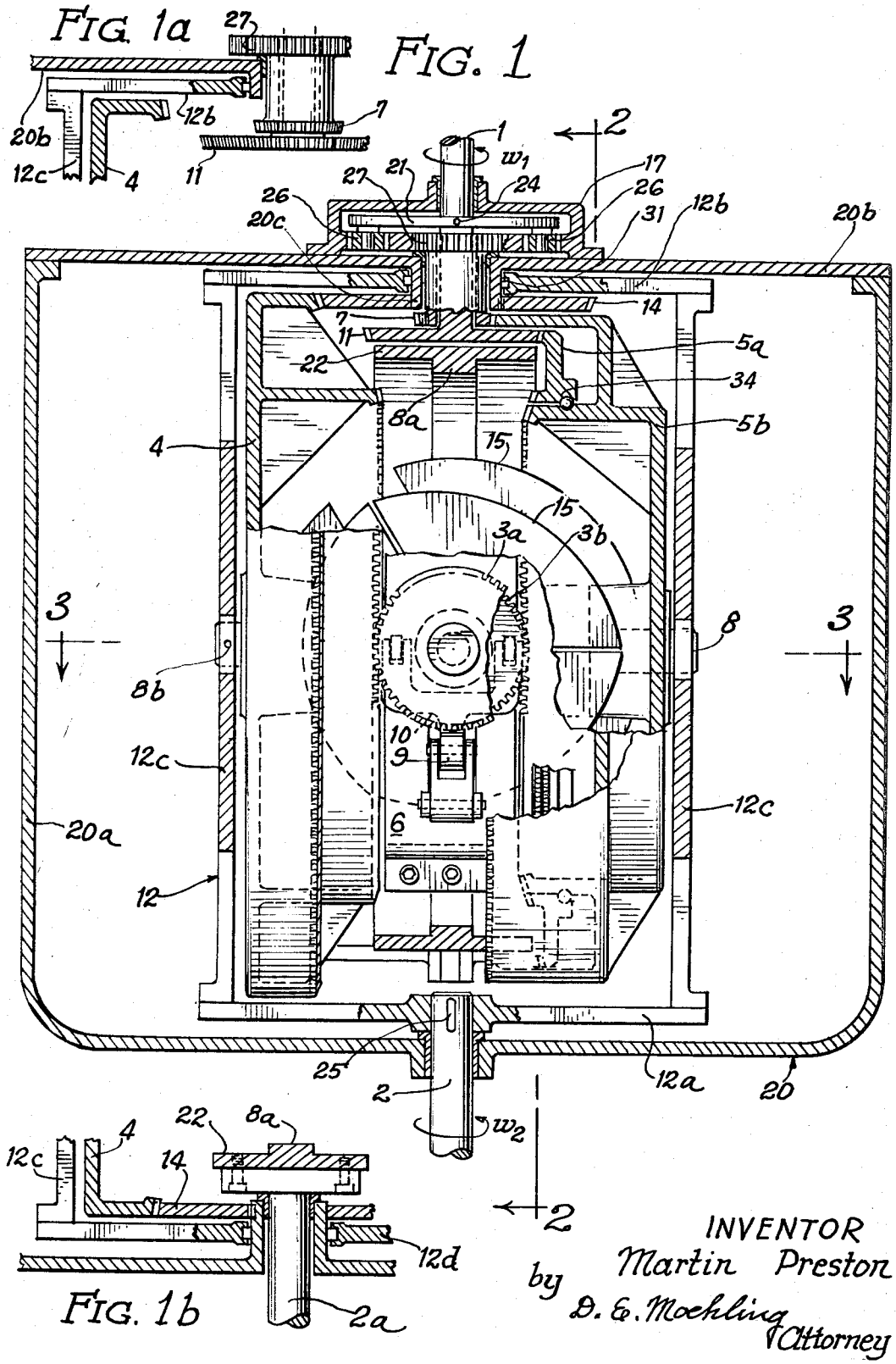
FIGURE 1 is an elevational sectional view of a simple embodiment of the device.

FIGURE 3 is a sectional plan view taken on line 3—3 on FIGURE 1.

FIGURE 4 is the view of an enlarged detail taken on line 4—4 on FIGURE 3.

FIGURE 5 is the view of an enlarged detail taken on line 5—5 on FIGURE 3.

Figure 6:
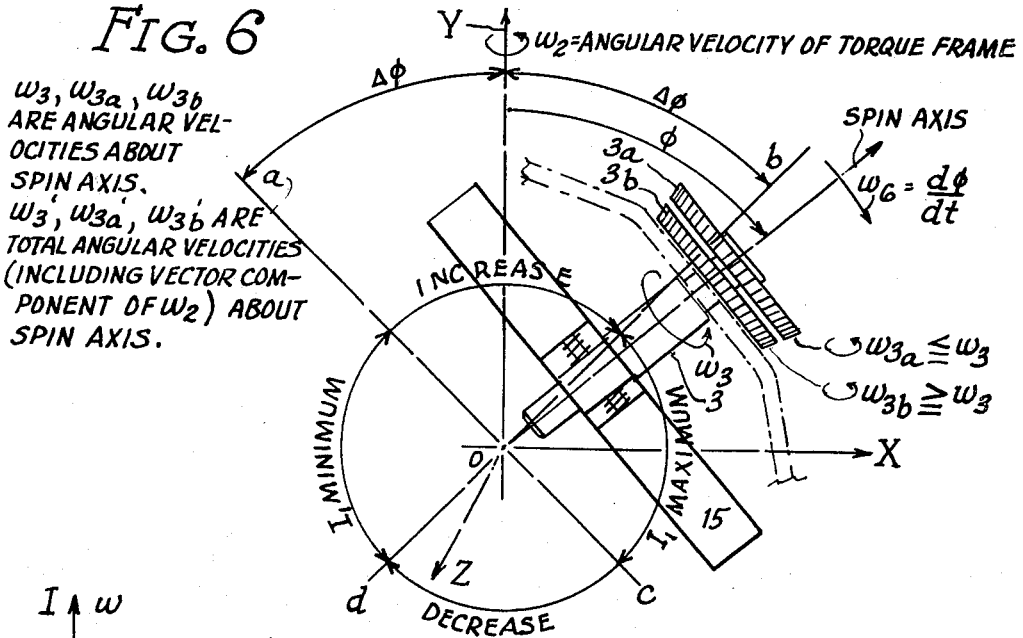

FIGURE 6 is a diagrammatic representation of part of FIGURE 2.

Figure 7:
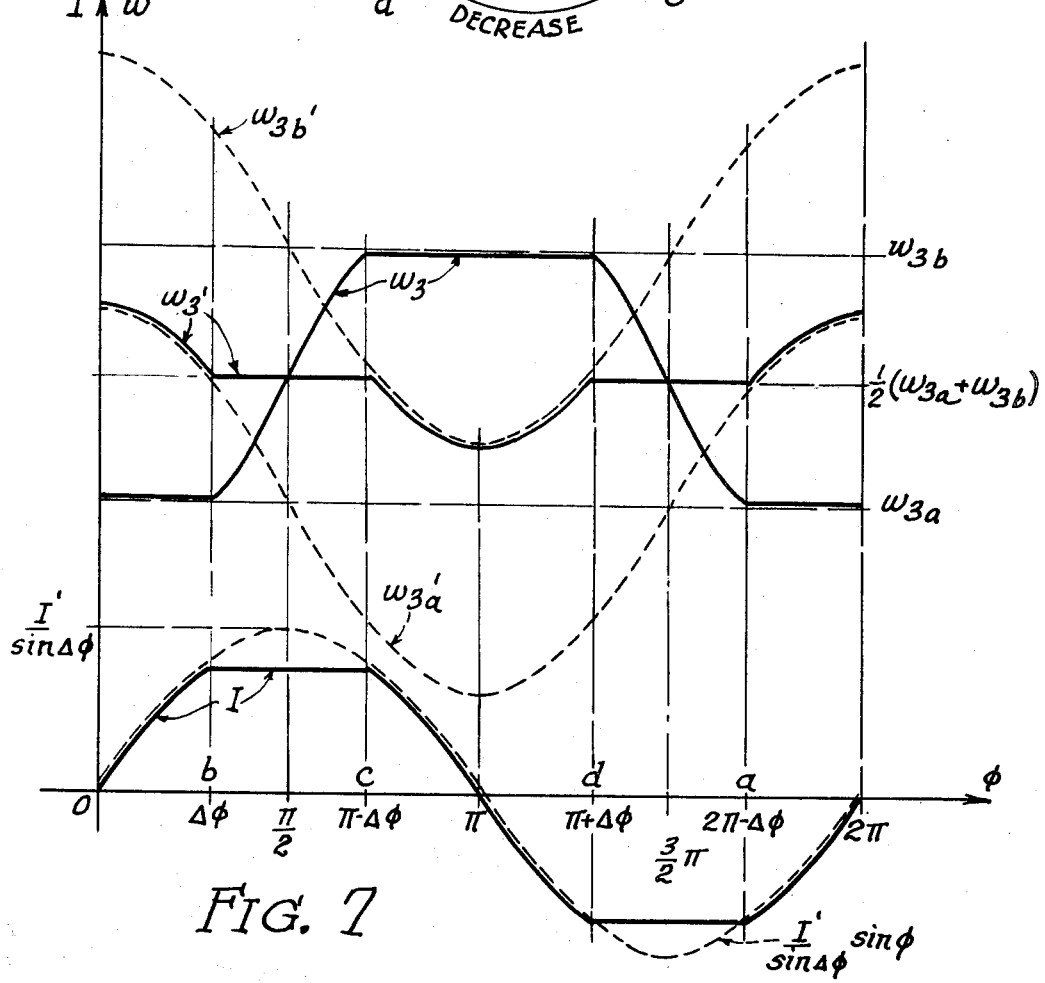

FIGURE 7 is a graph representing ceratin kinematic relations of the embodiment shown in FIGURES 1, 2 and 3.

Figure 8:
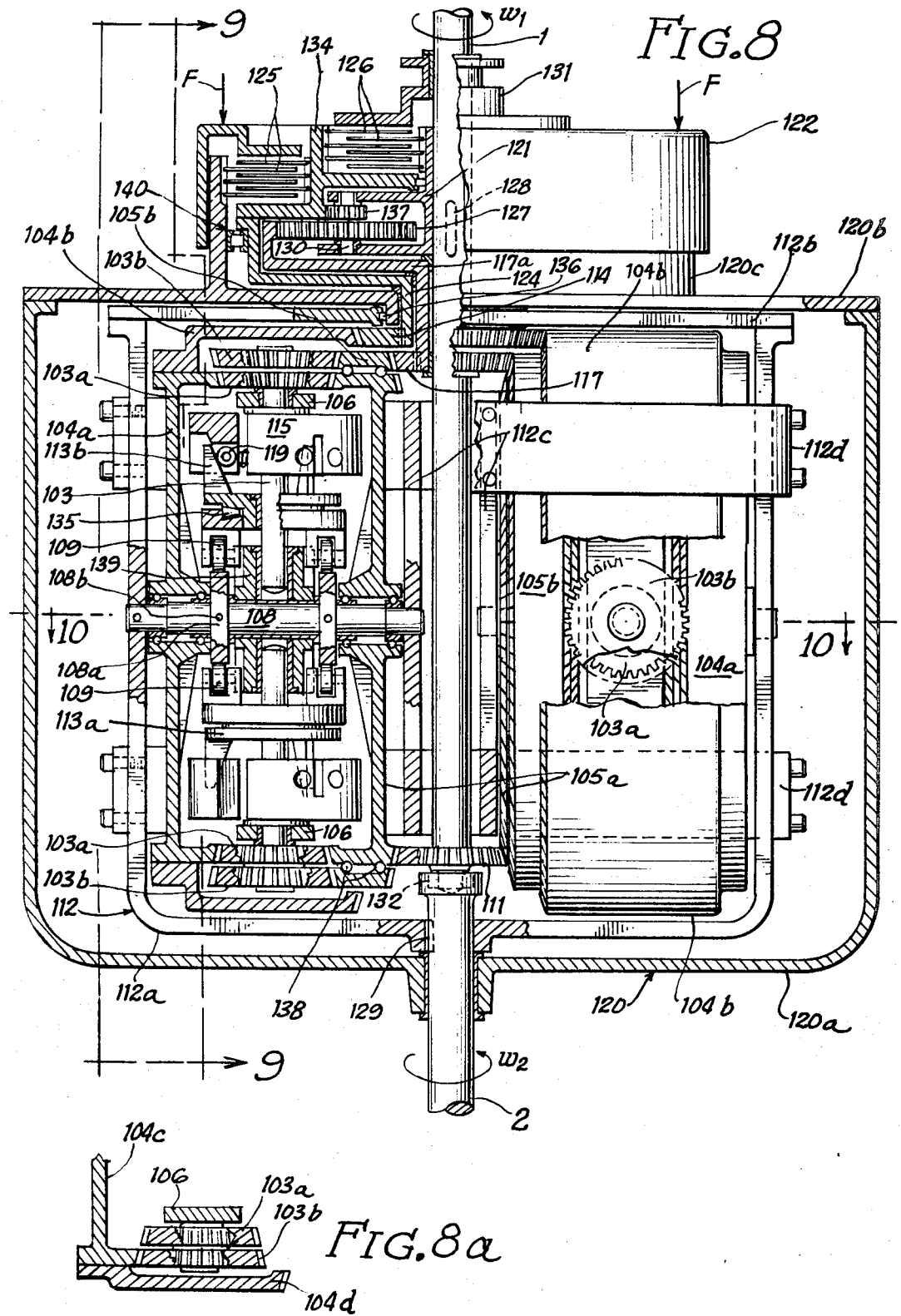

FIGURE 8 is an elevational view partly in section of a modified embodiment of the device.

FIGURE 8a is a fragmentary sectional view of a further modification of the embodiment shown on FIGURE 8.

Figure 9:
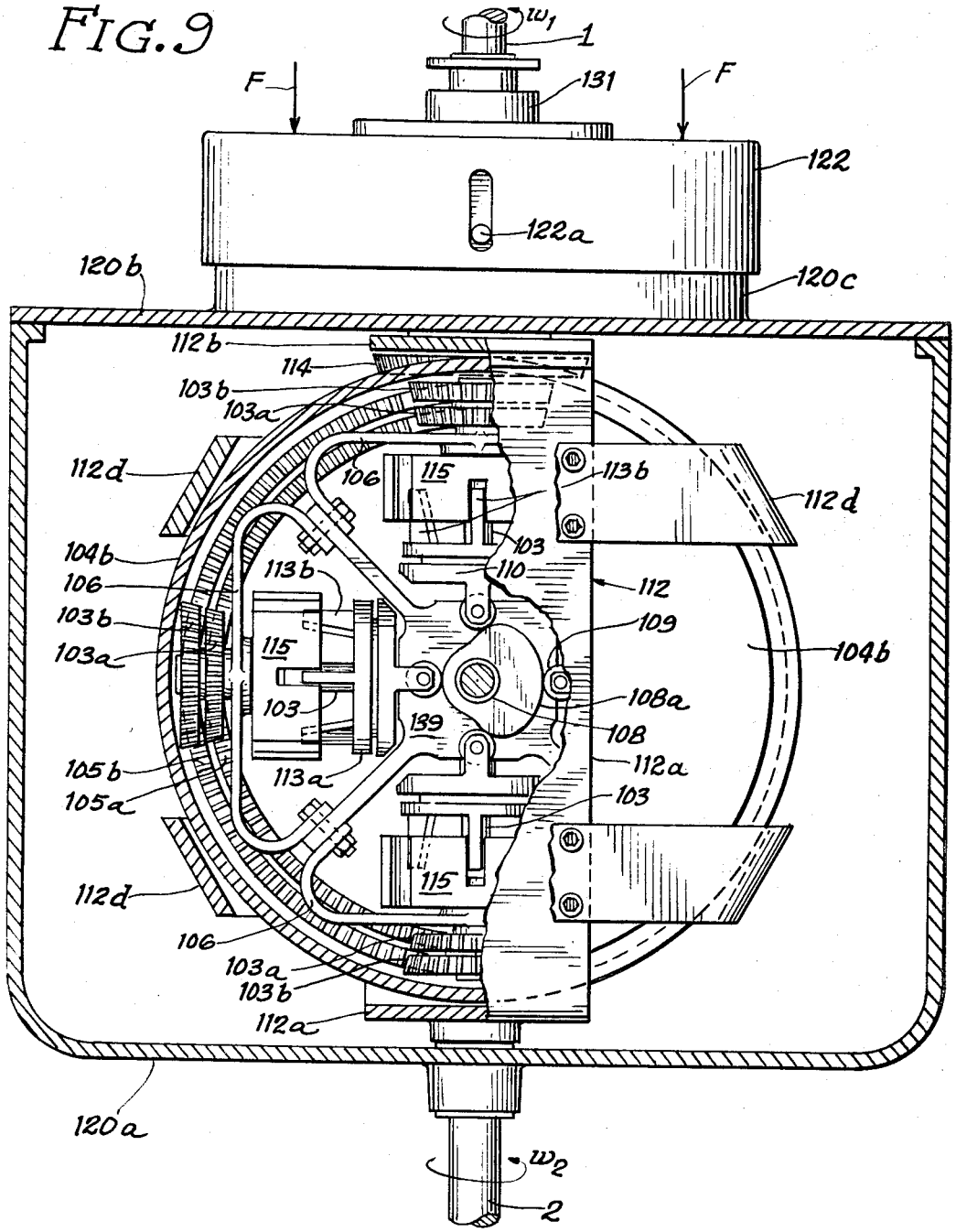

FIGURE 9 is an elevational sectional view taken on line 9—9 on FIGURE 8.

Figure 10:
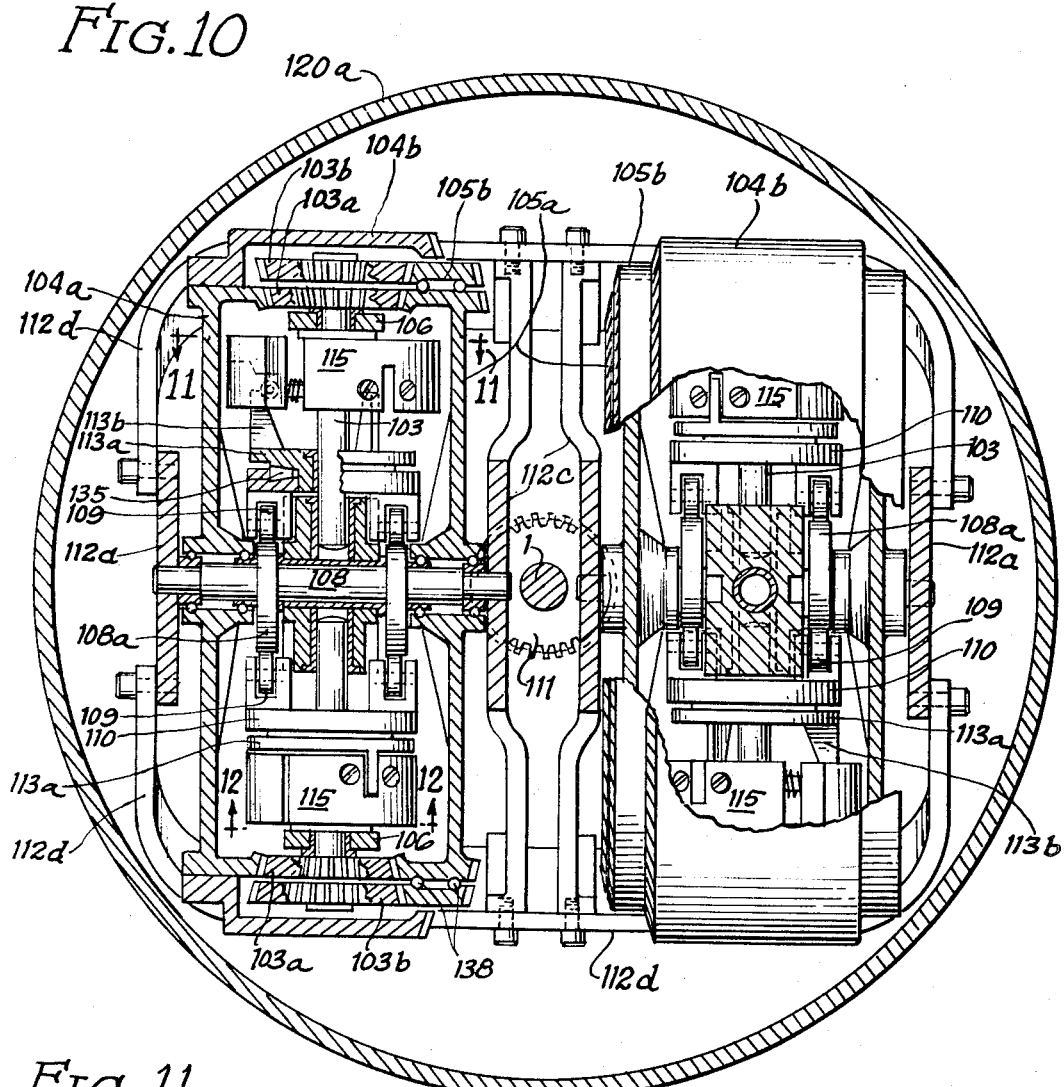

FIGURE 10 is a sectional plan view taken on line 10—10 on FIGURE 8.

Figure 11:
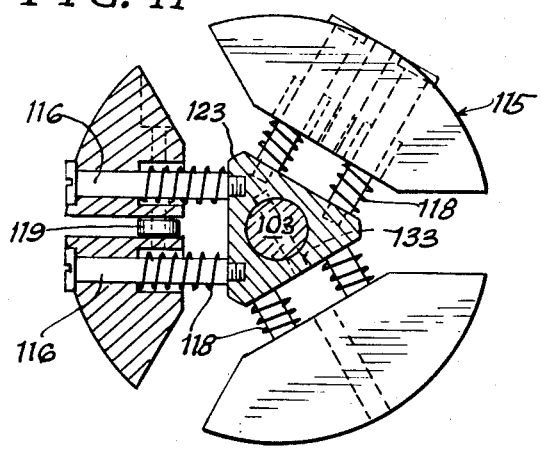

FIGURE 11 is an enlarged detail of a component part of the embodiment shown in FIGURE 10 taken on line 11—11.

Figure 12:
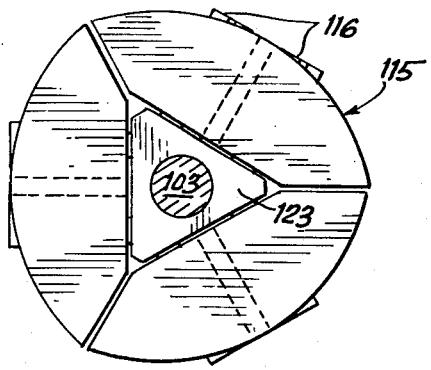

FIGURE 12 is an enlarged detail of a component part of the embodiment shown in FIGURE 10 taken on line 12—12.

In the illustrations identical part numbers are assigned to components of similar design performing similar functions. In preparing the illustrations certain dimensional proportions were used which do not conform with an economical or practical design but which appeared desirable for better graphic representation.

A simple embodiment of the device shown in FIGURES 1-3, comprises an input shaft 1 driven by an external power source and an output shaft 2 delivering power to the outside, both shafts being journalled in stationary housing 20 the top cover 20b of which carries gear case 17 in which the input shaft 1 is journalled, while the lower main body 20a of the housing is bushed for the output shaft 2.

The inside of the lower flanged portion of aforementioned gear case 17 forms an internal gear which is in mesh with planet pinions 26 mounted on planet carrier 21 that is affixed by pin 24 to input shaft 1 whose lower end is integral with bevel pinion 11. The sun gear 27 of this planetary gear set is provided with a tubular hub which is concentric with shaft 1 and which carries on its lower end bevel pinion 7, keyed thereto.

When input shaft 1 is turned, the above described gearing arrangement causes bevel pinion 7 to overrun bevel pinion 11, the former having more than twice the rotational speed of the latter.

Immediately above, and concentric with bevel pinion 7 is stationary anchor pinion 14 which is keyed to the lower end of the hollow hub-like extension 20c of aforementioned housing cover 20b.

Torque-frame 12, consisting of top plate 12b, side plates 12c and base plate 12a affixed to output shaft 2 by key 25, is rotatably supported in housing 20 by bearing 31 at the top and by the bushing of shaft 2 at the bottom.

Said torque-frame 12 carries precession axle 8 affixed thereto by pin 8b (FIGURE 1). Precession axle 8 in turn carries rotatably mounted bevel gears 4 (referred to as third bevel gear in the claims) and 5b (referred to as second bevel gear in the claims) and also ring gear 5a, the latter being supported by bearing 34 mounted in an annular recess of the web of gear 5b. Each of gears 4, 5a and 5b are provided with two sets of concentric bevel gear teeth (FIGURES 1 and 3) the outer rows of which being pair-wise in mesh with aforesaid pinions 14, 11 and 7, respectively.

Aforesaid precession axle 8, in addition to bevel gears 4 and 5b, also carries rotatably mounted spider hub 29 (FIGURES 2 and 3) having two radial extentions 30 to which are bolted spider frames 6. Said spider hub 29 and spider frames 6 serve as supports for two variable-inertia rotors mounted symmetrically on opposite sides of said precession axle 8.

Each one of said two rotors comprises a spin-axle 3, an irregular hexagon shaped sleeve 23 which is affixed by pin 32 to said spin-axle 3, a multiplicity of fly weights 15 which are slidingly mounted on radial pins 16 and are forced outward by compression springs 18 (FIGURES 4 and 5), and finally, thrust collar 13a which is slidingly mounted on spin-axle 3 and which has multiple fin-like extensions 13b serving as cams that engage cam rollers 19 (FIGURES 3 and 4) which are carried on pins 19a inserted across the central slot cut into fly weights 15 (FIGURES 4 and 5).

Normally, the fly weights of the above described variable-inertia rotor are forced outward by said compression springs and by centrifugal forces arising from the rotation of the rotor-assembly. This condition is represented by FIGURE 4. However, if said thrust collar 13a is pressed toward the fly weights, they will be forced inward (FIGURE 5) by the action of cams 13b engaging cam rollers 19.

As stated before, said rotor-assembly is supported by spider hub 29 and spider frame 6, both of them having inserted bushings in which spin-axle 3 is being journalled. The outer end of said spin-axle 3 carries bevel pinions 3a and 3b (FIGURES 2 and 3) through one-way clutches 33. These one-way clutches permit free unidirectional rotation of bevel pinions 3a and 3b relative to spin-axle 3 and in opposite direction to each other. Bevel pinion 3a meshes with the inner row of gear teeth of both aforementioned bevel gear 4 and ring gear 5a, while bevel pinion 3b meshes with the inner row of gear teeth of bevel gear 5b (FIGURE 3). The position of aforesaid thrust collar 13a (in the above descirbed rotor assembly) which controls the position of said fly weights and thereby the variable moment of inertia of the rotor assembly, depends on the angular displacement of the spider assembly as it rotates about aforementioned precession axle 8, as can be seen in FIGURES 2, 2b and 3. Bell crank 10, pivoted on lug 22a which is integral with spider frame 6, carries roller 9 on its upper fork and rollers 10a on its bifurcated lower fork. As roller 9 is forced inward by cam 8a which is cut into circular cam path 22 (FIGURES 1, 2, 2c and 3), rollers 10a will press against aforesaid thrust collar 13a causing fly weights 15 to move inward. Cam path 22 is fixedly supported by welded lugs 28 which are bolted to side plates 12c of aforementioned torque frame 12. The contour of the profile of cam 8a is such that the axial moment of inertia of each rotor is being kept at a constant minimum value during less than half a revolution of the spider frame and then, sequentially for an equal period, the moment of inertia of each rotor is kept at a steady maximum value. The transition between minimum and maximum values of the rotor inertia is being made gradually to obviate excessive inertia forces.

The angle $2\Delta\phi$, shown in FIGURE 6 as subtending the "ramp" portions of the otherwise circular cam profile, represents the transitional phase of the varying rotor inertia during a revolution of the spider assembly. The Y axis shown thereon corresponds with the fixed axis of rotation of torque-frame 12 and the Z axis represents the center line of precession axle 8. The angular velocity $\omega_6$ is the precessional velocity of the spin axis (which is the center line of spin axle 3) in the X—Y plane, furthermore, $\omega_3$, $\omega_{3a}$ and $\omega_{3b}$ are the spin velocities of the rotor, bevel pinion 3a and bevel pinion 3b, respectively, all velocities being referred to the X—Y plane. The *total* spin velocity of each of these members actually includes the vector component of the angular velocity $\omega_2$ of torque-frame 12 (in the direction of the spin axis). The "total" velocities of the rotor and the two bevel pinions are denoted as $\omega_3'$, $\omega_{3a}'$ and $\omega_{3b}'$, respectively.

To describe the operation of the device it will be first assumed that while input shaft 1 is driven at a constant angular velocity $\omega_1$, output shaft 2 is held fast, that is $\omega_2=0$.

Under these conditions bevel gear 4 will remain at rest but ring gear 5a and bevel gear 5b (FIGURE 1) will rotate together at the same speed. This will be so because the gear ratio between bevel pinion 11 (which is integral with shaft 1) and its mating gear 5a is equal to the overall ratio of the gear train interposed between shaft 1 and bevel gear 5b. Consequently, bevel pinions 3a and 3b (FIGURE 3), having the same central angle and being in mesh with ring gear 5a and bevel gear 5b, respectively, will be driven in the same direction at identical speeds. It follows from the foregoing that spin axle 3 on which pinions 3a and 3b are mounted (by means of one-way clutches 33) will be forced to rotate about its own axis and also will be forced to precess, causing the whole spider assembly to rotate about its own axis (FIGURES 2, 3 and 6).

During the phase of increasing rotor inertia it will be only the one-way clutch built into bevel pinion 3a which will be actively engaged in transmitting torque from this pinion to the spin axle, while bevel pinions 3b, whose one-way clutch acts in the opposite direction, will not participate in power transmittal.

Contrarywise, during the phase of decreasing rotor inertia, it will be pinion 3b that will transmit torque from the rotor to bevel gear 5b. Under these conditions the previously defined velocities of the rotors and associated pinions will be constant and equal, that is, $$\omega_3=\omega_{3a}=\omega_{3b}=\text{constant}$$

Furthermore, $\omega_3'=\omega_{3a}'=\omega_{3b}'$. Thus the kinetic energy absorbed by the rotor whose inertia increases from a minimum to a maximum value will be fed back by the rotor whose energy decreases from a maximum to a minimum value. With no external work performed, the mean external torque applied to input shaft 1 will be zero.

On the other hand, the gyroscopic moments acting on the spider frame (generated by the forced precession of the spin axes of the rotors) will not balance during a full revolution of the spider frame about its own axis, owing to the cyclical change of the rotor inertia, as indicated in FIGURE 6. Considering the Y-component of the moments acting on torque-frame 12, it can be shown that the instantaneous contribution of the individual rotor to this moment will equal: $I_1\omega_3\omega_6 \sin \phi$, where $I_1$ is the instantaneous axial moment of inertia of the rotor, $\omega_3$ is its spin velocity, $\omega_6$ its precessional velocity and $\phi$ the angle between the Y axis and the spin axis. It can be, furthermore, deduced from FIGURE 6 that since during the first half of a revolution of the spider frame ($0<\phi<\pi$) the mean value of $I_1$ will be greater than during the second half ($\pi<\phi<2\pi$), the time integral of the Y-component of the gyroscopic moment will be positive, that is, the mean moment applied to the torque frame will be in the direction of $\omega_2$ as indicated in FIGURE 6.

Designating the minimum value of the rotor inertia $I_1$ as $I_0-I'$ and its maximum value as $I_0+I'$ and, furthermore, since the effect of the mean valve $I_0$ of the inertia of one rotor cancels out that of the other, it will suffice to consider only the *deviation* of the instantaneous rotor inertia from its mean value as contributing to the moments acting on the torque-frame.

Moreover, giving the profile of the "ramp" portion of cam 8a such a contour that the instantaneous value I of this deviation will be $$I = I' \left| \frac{\sin \phi}{\sin \Delta \phi} \right|$$

in the intervals $-\Delta\phi \leq \phi \leq \Delta\phi$ and $(\pi-\Delta\phi) \leq \phi \leq (\pi+\Delta\phi)$, while in the "steady state" phases $I=I'$, then the total instantaneous driving torque produced by the two rotors acting on the torque-frame can be expressed as the following positive quantity:

$$2I'\omega_3\omega_6 |\sin \phi|$$

in which $\omega_3$ and $\omega_6$ are expressible as linear functions of the input speed $\omega_1$. The graph of the variable I is shown in FIGURE 7.

It should be noted that the angle $2\Delta\phi$ subtending the "ramp" portions of the cam profile *is not an arbitrary quantity but is definable as a function of certain gear ratios in the device*. It should be also pointed out that the net output torque available on output shaft 2 will include, in addition to the above defined component of the gyroscopic moment, also the sum of the instantaneous moments contributed to the torque-frame by pinions 7, 11 and 14 drivingly engaged therewith.

In the foregoing the operating condition was described in which the input shaft speed was constant and the output shaft was held fast. Next, the condition will be considered in which the input shaft speed, as before, is held constant but the output shaft speed varies. This condition arises when the external load applied to the output shaft becomes smaller than the stall torque (defined as the external resisting load just sufficient to stop rotation of the shaft). The output shaft then starts rotating and its speed will vary as the external load changes.

Under these conditions and at increasing output shaft speed, bevel gears 4 and 5b and ring gear 5a will all rotate in the same direction up to a certain output shaft speed, but bevel gear 5b will overrun ring gear 5a. Bevel gear 5b and ring gear 5a will rotate at the same speed (in clockwise direction if viewed from the right hand side in FIGURE 1) only if the output shaft is held fast, as heretofore described. However, as soon as the output shaft is released and starts rotating in the direction indicated in FIGURE 1, the original (clockwise) rotational speed of both bevel gear 5b and ring gear 5a will be reduced and the speed reduction of the latter will be greater than that of the former. Hence, comparing the resultant speed of these two gears it will be evident that bevel gear 5b, having sustained the smaller speed loss, will now run faster than ring gear 5a; that is, the former will overrun the latter. How the rotation of the output shaft affects the rotational speeds of bevel gear 5b and ring gear 5a will become evident from FIGURE 1 by the observation that torque frame 12 on which both bevel gear 5b and ring gear 5a are journalled is rigidly connected to the output shaft and, therefore, the rotation of the output shaft in the direction indicated in FIGURE 1 will impose a counterclockwise rotation on bevel gear 5b because the latter is engaged with bevel pinion 7 and will also impose a similar but more rapid counter-clockwise rotation on ring gear 5a as a result of the engagement of gear 5a with bevel pinion 11. Since the central angle is greater for bevel pinion 11 than for bevel pinion 7, the counter-clockwise speed component is greater and the resultant net clockwise speed is lesser for ring gear 5a than for bevel gear 5b. If the output shaft speed increases beyond that certain point, first, ring gear 5a will change direction of rotation, and then bevel gear 5b. The flow of power, will be similar to that described for the previous case, that is, during the phase of increasing rotor inertia, power will be transmitted from the input shaft through ring gear 5a and bevel pinion 3a to the rotor. During the phase of decreasing rotor inertia the flow of power will be from the rotor through bevel pinion 3b, bevel gear 5b and through the planetary gear train to the input shaft. However, in contrast to the previous case, power will be transmitted from the input shaft to the rotor during the period of constant rotor inertia. The net balance of the time integrals of the flow of power to and from the input shaft constitutes the work performed by the output shaft, friction being disregarded. The speed relations of the rotor and the therewith associated bevel pinions 3a and 3b are shown in FIGURE 7.

The essential component of the device, the rotor comprising fly weights whose rotary inertia is controlled by the angle of precession was described in the preceding text as consisting of weights slidingly arranged on spindles. These weights could be also pivotally suspended or, alternatively, arranged to roll on curved paths which arrangement may have desirable features regarding dynamic balance. The presented arrangement is merely an example whose graphic representation seemed to be the most convenient compared to several alternative constructions. For the sake of compactness, the fly weights of the rotor should preferably be made of heavy metal, such as tungsten alloy.

The constants $c_1$ and $c_2$ in the performance Equations 1 and 2 given earlier in the text, can be defined as follows:

$$c_1 = \frac{I'}{2\pi} \left(\frac{\tan \alpha}{\tan \beta}\right)^2 \times (\tan \alpha - \tan \delta)$$

$$c_2 = \frac{\tan \delta + \tan \gamma}{\tan \alpha}$$

in which $I'$, as previously defined, is the maximum deviation of the axial rotor inertia from its median value, $\alpha$ is half of the central angle of pinion 11,
$\beta$ is half of the central angle of pinions 3a and 3b,
$\gamma$ is half of the central angle of pinion 14,
$\delta$ is half of the central angle of pinion 7.

FIGURES 1a and 1b represent a slight modification of the original embodiment shown in FIGURE 1. This modification involves the relocation of anchor pinion 14 from the top of the housing to the bottom and involves also a change in the connection between output shaft 2 and torque-frame 12. In the original embodiment output shaft 2 is keyed to base plate 12a of the torque-frame by key 25, whereas in the modification base plate 12d is journalled on a hub-like extension of the housing and output shaft 2 is bolted to cam path 22 which in turn is rigidly connected to torque-frame 12.

Functionally, the effect of this modification is a reversal in the direction of rotation of bevel gear 4. The effect of this change is also the sign reversal of the term $\tan \gamma$ occurring in the above given definition of the constant $c_2$.

A more radical change of the original embodiment is shown in FIGURES 8–12. Although the operating principle of this modified design is the same as that of the original embodiment shown in FIGURES 1–7, the performance characteristics of the modified embodiment offer a wider range of application. The difference between the two designs can be summarized as follows:

(1) The latter design, having 8 instead of 2 rotors, delivers a more uniform torque, obviating the need for flywheels.

(2) The latter design incorporates brake and clutch means that permit limitation of the output shaft velocity, they provide also means for locking together the input and output shafts and thereby cause the internal mechanism of the device to rotate as a solid body with no relative movement between its component parts and finally, they make it possible to lock up the drive completely. It should be noted, however, that aforesaid brake and clutch means could be incorporated in the original embodiment shown in FIGURES 1–7 with the same result.

As shown in FIGURES 8 and 9, housing 120 comprises cylindrical shell 120a having a central hub extension at its bottom in which output shaft 2 is journalled, cover 120b whose upper cylindrical extension 120c carries bearing 140, brake disks 125 and cylindrical member 122 which serves for setting aforesaid brake when downward force F is applied thereto, said cylindrical member 122 being guided by pins 122a screwed into said cylindrical extension 120c. The inner race of said bearing 140 supports gear case 124 whose cover 134 carries mating brake disks 125 on splines cut into the outer surface of its cylindrical extension and also carries clutch disks 126 on splines cut into the inner surface of its cylindrical extension. The lower flanged portion of said gear case cover 134 forms an internal gear which is in mesh with planet pinion 137. Mating clutch disks 126 are carried on splines cut into planet carrier 121 which is keyed to input shaft 1 by key 128. Said input shaft 1 is coaxial with aforementioned output shaft 2 and carries on its lower end integral bevel pinion 111. The lower end of input shaft 1 is journalled in pilot bearing 132 inserted into the extended top of output shaft 2.

Clutch pressure plate 131, slidingly mounted on the upper portion of input shaft 1, serves to engage clutch, and thereby lock up the planetary gear set consisting of aforesaid planet carrier 121, planet pinions 127 and 137 and internal gear 117a. Said planet pinions 127 and 137 are keyed to removable shaft 130, bushed in said planet carrier 121. The lower hollow cylindrical end of aforesaid internal gear 117a carries bevel pinion 117, keyed thereto. Similarly, the lower hollow cylindrical extension of aforesaid gear case 124 carries anchor pinion 114, keyed thereto.

Torque-frame 112 consists of a yoke shaped lower part 112a, keyed to said output shaft 2 by key 129, of a top plate 112b, journalled by bearing 136 on a central hub-like extension of housing cover 120b, of two lateral plates 112d (FIGURES 8, 9 and 10) and, finally, of two H-shaped, flanged, side plates 112c, adjacent to input shaft 1. These components of the torque frame, being bolted together, form a rigid assembly which carries two precession axles 108, coaxially disposed and symmetrically located with reference to input shaft 1. Each of these precession axles in turn carry a rotatable bevel gear 104a (near their outer end), another rotatable bevel gear 105a (near their inner end) a rotatable spider hub 139 (at their center) and two fixed cam disks 108a (at intermediate points, between said bevel gears and said spider hub). Attached to said spider hub 139 are four spider frames 106 bolted to radial, fin-like extensions of said spider hub. Bushings provided in aforesaid spider hub and spider frames serve as journals for four spin axles 103, whose axes are set radially, spaced 90 degrees from each other. Each of these spin axles carry on their outer end bevel pinions 103b and 103a which are mounted thereon by means of one-way clutches whose free rotation is in opposite direction from each other. Additionally, spin axles 103 carry sliding fly weights 115 (FIGURES 11 and 12) mounted on pins 116 which are screwed into triangular sleeve 123 affixed by pin 133 to spin axle 103. Compression springs 118 tend to force said fly weights outward. Cams 113b engaging cam roller 119 tend to force said fly weights inward. Said cams 113b are integral parts of bushed sleeve 113a, slidingly mounted on spin axle 103. Thrust collar 110 which is provided with two cam followers 109 riding on aforementioned cam disks 108a, tends to force bushed sleeve 113a outward by means of interposed thrust bearing 135, causing fly weights 115 to move radially inward. Said bevel pinion 103b meshes with ring gear 105b which is carried on the outer circumference of aforesaid bevel gear 105a by means of bearing 138. On the other hand, said bevel pinion 103a meshes simultaneously with aforesaid bevel gears 104a and 105a, the former of which is drivingly connected with a concentric third bevel gear 104b. Bevel gears 105a and 104b and ring gear 105b in turn are pair wise in mesh with previously mentioned bevel pinion 111, anchor pinion 114 and bevel pinion 117, respectively.

Considering the operation of the device and assuming that brake 125 is set (engaged) while clutch 126 is released (disengaged) it will be seen that anchor pinion 114 will be locked to housing 120, while the planetary gear set (comprising planet carrier 121, planet pinions 127 and 137 and internal gear 117a) will be fully operational. Under these conditions there will be functionally a consistent one-to-one relationship between the corresponding parts of the device and that of the original embodiment shown on FIGURES 1–7. Hence, both the functioning and the operating characteristics will be as described previously.

Alternatively, assuming that brake 125 is released, while clutch 126 is engaged, it will be seen that since bevel pinions 111 and 117 and anchor pinion 114 will be locked together, the whole internal mechanism including the torque-frame and the therewith associated output shaft will rotate together like a solid body. Hence, a straight drive-through condition will result.

If, as a third alternttive, both brake 125 and clutch 126 are simultaneously engaged, the drive will be locked up altogether.

In the foregoing description item 132 was described as a pilot bearing interposed between the ends of the input and output shafts. If this bearing were replaced by a one-way clutch that would prevent the output shaft from overrunning the input shaft, an automatic speed limiting feature would be obtained. Similarly, if roller bearing 140 (interposed between the gear case and the housing) were replaced by a one-way brake, a certain limiting ratio of the output speed to input speed would be obtained.

The fragmentary detail shown in FIGURE 8a represents a further modification of the device affecting its operating characteristics, that is, the value of the constants in the performance Equations 1 and 2. This modification brings bevel pinion 103b in mesh with bevel gear 104c while in the original embodiment it was bevel pinion 103a that was meshing with this bevel gear (designated as 104a in FIGURE 8).

In the illustrations all bevel gears are shown as being of the straight-tooth-type. They could be replaced advantageously with spiral bevel gears.

It should be noted also that at the cost of narrowing the range of the performance characteristics of the embodiment shown in FIGURES 1–12, the anchor pinion (14 and 114) can be altogether eliminated from the device. In this case the mating outer row of gear teeth of bevel gear 4 (gear 104b in the latter embodiment) could be also omitted and the remainder of this gear (gear 104a in the latter embodiment) should be keyed to the precession axle, this modified gear being referred to in the claims as "first bevel gear." The aforesaid performance Equations 1 and 2 are valid for these modifications involving the elimination of the anchor pinions, but the value of the parameter $\gamma$, denoting one half of the central angle of the anchor pinions 14 and 114 should be taken as zero in the expression defining the constant $c_2$ occuring in the performance equations.

What I claim is:

1. A mechanical torque converter comprising a stationary housing in which a first shaft and a second shaft are journalled, the first shaft being driven by an outside source of power and the second shaft delivering power to the outside; a rotatably mounted torque-frame drivingly connected to said second shaft, said torque frame being provided with a precession axle mounted on said torque-frame; a spider frame rotatably mounted on said precession axle and carrying at least one rotatably mounted spin axle the axis of which is at right angles to the axis of said precession axle; a variable inertia rotor consisting of at least two fly weights mounted movably on said spin axle in such manner that their radial distance from the axis of said spin axle can be varied; means for controlling said radial distance as a prescribed function of the angle of rotation of said spider frame about said precession axle; a first and second pinion gear mounted on said spin axle by means of one-way clutches whose free rotation is in opposite direction from one another; gear means interposed between said first shaft and said first and second pinion gears to transmit rotary motion from said first shaft to said spin axle causing it to rotate about its own axis, and simultaneously to transmit rotary motion to said spider frame causing it to rotate about said precession axle in such a manner that a unidirectional gyroscopic torque will be generated and applied to said torque frame.

2. A mechanical torque converter comprising a stationary housing in which a first shaft and a second shaft are journalled, the first shaft being driven by an outside source of power and the second shaft delivering power to the outside; a rotatably mounted torque-frame drivingly connected to said second shaft, said torque frame being provided with a precession axle mounted on said torque-frame; a spider frame rotatably mounted on said precession axle and carrying at least one rotatably mounted spin axle the axis of which is at right angles to the axis of said precession axle; a variable inertia rotor consisting of at least two fly weights mounted movably on said spin axle in such manner that their radial distance from the axis of said spin axle can be varied; means for controlling said radial distance as a prescribed function of the angle of rotation of said spider frame about said precession axle; a first and second pinion gear mounted on said spin axle by means of one-way clutches whose free rotation is in opposite direction from one another; gear means interposed between said first shaft and said first and second pinion gears to transmit rotary motion from said first shaft to said spin axle causing it to rotate about its own axis, and simultaneously to transmit rotary motion to said spider frame causing it to rotate about said precession axle in such a manner that a unidirectional gyroscopic torque will be generated and applied to said torque frame, further characterized in that an anchor pinion is rigidly attached to said stationary housing and gear means are interposed between said anchor pinion and said first pinion gear.

3. The device of claim 1 further characterized in that said first shaft instead of receiving power from an outside source, delivers power to the outside and said second shaft instead of delivering power to the outside is driven by an outside source of power.

4. The device of claim 1 wherein said gear means interposed between said first shaft and said first and second pinion gears consist of a first bevel pinion affixed to said first shaft, a ring gear carried by said precession axle and provided with two concentric sets of gear teeth which are in mesh with said first bevel pinion and with one of said first and second pinion gears, respectively, a second bevel pinion driven through a gear train by said first shaft, and a second bevel gear carried by said precession axle and provided with two concentric sets of gear teeth which are in mesh with said second bevel pinion and with the other of said first and second pinion gears, respectively.

5. The device of claim 1 further characterized in that said first pinion gear meshes with a first bevel gear keyed to said precession axle.

6. The device of claim 2, further characterized in that said gear means interposed between said anchor pinion and said first pinion gear consists of a third bevel gear mounted on said precession axle and provided with two concentric sets of gear teeth which are in mesh with said anchor pinion and said first pinion gear, respectively.

References Cited

FOREIGN PATENTS 887,896   8/1943   France.

FRED C. MATTERN, JR., *Primary Examiner.*

T. C. PERRY, *Assistant Examiner.*